US010318255B2

(12) United States Patent
Meijer et al.

(10) Patent No.: US 10,318,255 B2
(45) Date of Patent: Jun. 11, 2019

(54) AUTOMATIC CODE TRANSFORMATION

(71) Applicant: Microsoft Technology Licensing, LLC, Redmond, WA (US)

(72) Inventors: Henricus Johannes Maria Meijer, Redmond, WA (US); John Wesley Dyer, Seattle, WA (US)

(73) Assignee: Microsoft Technology Licensing, LLC, Redmond, CA (US)

( * ) Notice: Subject to any disclaimer, the term of this patent is extended or adjusted under 35 U.S.C. 154(b) by 182 days.

(21) Appl. No.: 15/613,047

(22) Filed: Jun. 2, 2017

(65) Prior Publication Data

US 2017/0269913 A1    Sep. 21, 2017

Related U.S. Application Data

(63) Continuation of application No. 15/090,596, filed on Apr. 4, 2016, now abandoned, which is a continuation
(Continued)

(51) Int. Cl.
*G06F 9/44* (2018.01)
*G06F 8/40* (2018.01)
(Continued)

(52) U.S. Cl.
CPC .................. *G06F 8/40* (2013.01); *G06F 8/24* (2013.01); *G06F 8/30* (2013.01)

(58) Field of Classification Search
CPC ........................................................ G06F 8/40
(Continued)

(56) References Cited

U.S. PATENT DOCUMENTS 5,555,415 A    9/1996    Allen
5,727,214 A    3/1998    Allen
(Continued)

FOREIGN PATENT DOCUMENTS

WO    9923558 A1    5/1999

OTHER PUBLICATIONS

"Final Office Action Issued in U.S. Appl. No. 12/058,221", dated Apr. 23, 2012, 32 Pages.
(Continued)

*Primary Examiner* — Evral E Bodden
(74) *Attorney, Agent, or Firm* — Fiala & Weaver P.L.L.C.

(57) ABSTRACT

A method includes receiving stateful code that is called from a first location and executed at a second location. The method includes acquiring contextual information associated with the stateful code. The method includes determining a location for storage of state information based on the contextual information. The method includes, based on the determined location, transforming the stateful code into stateless code. The transforming includes storing state information for the stateful code into storage at the determined location. In response to the determined location being the first location, the stateless code includes: retrieving the state information from the storage; from the first location, sending a call to the second location; at the first location, receiving a response from the second location; and storing the new state information into the storage at the first location. One argument of the call includes the retrieved state information. One return value includes new state information.

20 Claims, 14 Drawing Sheets

Related U.S. Application Data of application No. 12/058,221, filed on Mar. 28, 2008, now Pat. No. 9,317,255.

(51) Int. Cl.
*G06F 8/20* (2018.01)
*G06F 8/30* (2018.01)

(58) Field of Classification Search
USPC .......................................................... 717/136
See application file for complete search history.

(56) References Cited

U.S. PATENT DOCUMENTS

| | | | |
|---|---|---|---|
| 6,601,192 | B1* | 7/2003 | Bowman-Amuah ........................ G06F 11/3688 714/38.12 |
| 6,710,786 | B1 | 3/2004 | Jacobs et al. |
| 6,748,555 | B1 | 6/2004 | Teegan et al. |
| 6,934,709 | B2 | 8/2005 | Tewksbary |
| 6,941,555 | B2 | 9/2005 | Jacobs et al. |
| 7,127,514 | B2 | 10/2006 | Hunt |
| 7,130,891 | B2 | 10/2006 | Bernardin et al. |
| 7,246,344 | B1* | 7/2007 | Christensen ............... G06F 8/34 717/105 |
| 7,290,056 | B1 | 10/2007 | McLaughlin, Jr. |
| 7,313,575 | B2* | 12/2007 | Carr ....................... G06Q 10/10 |
| 7,313,757 | B2 | 12/2007 | Bradley et al. |
| 7,389,514 | B2 | 6/2008 | Russell et al. |
| 7,461,292 | B2 | 12/2008 | Barga et al. |
| 7,657,436 | B2* | 2/2010 | Elmore ................... G06Q 10/06 705/1.1 |
| 7,707,564 | B2 | 4/2010 | Marvin et al. |
| 8,051,098 | B2 | 11/2011 | Bisbee et al. |
| 2002/0087657 | A1* | 7/2002 | Hunt ........................ G06F 9/546 709/217 |
| 2002/0169889 | A1 | 11/2002 | Yang et al. |
| 2003/0049081 | A1* | 3/2003 | Chapel ................... B23G 5/005 408/1 R |
| 2004/0015898 | A1* | 1/2004 | Tewksbary ................. G06F 8/41 717/140 |
| 2004/0181530 | A1* | 9/2004 | Smith ..................... G06F 9/547 |
| 2005/0044197 | A1 | 2/2005 | Lai |
| 2006/0053410 | A1 | 3/2006 | Charisius et al. |
| 2007/0005770 | A1 | 1/2007 | Kramer et al. |
| 2007/0156842 | A1 | 7/2007 | Vermeulen et al. |

OTHER PUBLICATIONS

"Final Office Action Issued in U.S. Appl. No. 12/058,221", dated Jul. 2, 2014, 39 Pages.

"Final Office Action Issued in U.S. Appl. No. 12/058,221", dated Apr. 11, 2013, 32 Pages.

"Non Final Office Action Issued in U.S. Appl. No. 12/058,221", dated Oct. 7, 2013, 36 Pages.

"Non Final Office Action Issued in U.S. Appl. No. 12/058,221", dated Aug. 28, 2012, 36 Pages.

"Non Final Office Action Issued in U.S. Appl. No. 12/058,221", dated Aug. 3, 2011, 26 Pages.

"Non Final Office Action Issued in U.S. Appl. No. 12/058,221", dated Apr. 2, 2015, 39 Pages.

"Notice of Allowance Issued in U.S. Appl. No. 12/058,221", dated Dec. 10, 2015, 11 Pages.

"Non Final Office Action Issued in U.S. Appl. No. 15/090,596", dated May 18, 2016, 31 Pages.

"Notice of Allowance Issued in U.S. Appl. No. 15/090,596", dated Mar. 2, 2017, 7 Pages.

Biswas, Koushik, "Everthing about REST Web Services—What and How—Part 1", Retrieved from: <<https://www.codeproject.com/Articles/21174/Everything-About-REST-Web-Services-What-and-How-Pa>>, Nov. 4, 2007, 6 Pages.

Cooper, et al., "Links: Web Programming Without Tiers", In Proceedings of the 5th International Conference on Formal Methods for Components and Objects, Nov. 7, 2006, 30 Pages.

Li, et al., "Combining Events and Threads for Scalable Network Services Implementation and Evaluation of Monadic, Application-level Concurrency Primitives", In Proceedings of the Programming Language Design and Implementation Conference, Newsletter ACM SIGPLAN Notices, vol. 42, Issue 06, Jun. 15, 2007, 11 Pages.

Loogen, et al., "Parallel Functional Programming in Eden", In Journal of Functional Programming, vol. 15, Issue 3, May 1, 2005, 46 Pages.

* cited by examiner

AUTOMATIC CODE TRANSFORMATION

CROSS-REFERENCE TO RELATED APPLICATIONS

The present application is a continuation of U.S. patent application Ser. No. 15/090,596 filed Apr. 4, 2016, which is a continuation of U.S. patent application Ser. No. 12/058,221 (now U.S. Pat. No. 9,317,255) filed Mar. 28, 2008. The entire disclosures of the applications referenced above are incorporated by reference.

BACKGROUND

A system whose performance improves proportionally to added hardware capacity is said to be scalable. Scalability is an important property for distributed applications such as web services, because it is desirous to scale such systems as the number of users grows. In this context, developers are particularly interested in "scale out," which means scaling a system by adding more resources as opposed to "scale up," which means increasing the capacity of existing resources in a system.

Scalability is usually inhibited due to bottlenecks or parts of the system that are inherently slow. For example, Amdahl's law states that if "N" is the number of processors, "s" is the amount of time spent (by a serial processor) on serial parts of a program, and "p" is the amount of time spent (by a serial processor) on parts of the program that can be done in parallel, the speed up of the total system is given by: "Speedup=(s+p)/(s+p/N)". That is, scalability is fundamentally inhibited by the serial parts/bottlenecks of the system.

A significant tension in making systems scalable is removing bottlenecks while keeping the overall system easy to use. For example, for programmers it is convenient and commonplace to use session state across several interactions. Session state refers to a set of conditions valid for a particular user session. Consider a virtual shopping chart, for instance. Here, a user adds items in sequence to the cart until the session ends with a final purchase. However, if a web service is stateful, this introduces a bottleneck into the system since each additional web server needs to access a central store where the state of all running sessions on all servers is stored. Alternatively, each server has to maintain local storage of its running sessions, which means that each session must run on the server that maintains its state thus preventing scale out.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to code transformation to facilitate scalable programming. In accordance with an aspect of the disclosure, a mechanism is provided to transform stateful code into stateless code. Programmers can write code in a traditional stateful style, which can then be transformed automatically into stateless code in a state transformer monad style, for instance. In this manner, state can be made explicit and subsequently threaded across operations behind the scenes. As a result, code can be made scalable while not burdening a programmer with generation of counterintuitive stateless code. According to another aspect, state can be stored in a location or locations that maximize code scalability and/or where it is most appropriate in a given context.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to automatic code transformation from stateful to stateless are described in detail hereinafter. The most scalable system occurs where code is stateless. This eliminates serial parts of computations and hence scale out can be achieved by adding more servers, for instance. However, statelessness is counterintuitive to a vast majority of programmers. In fact, most programmers prefer to utilize languages that are inherently stateful. For example, that is the point of objects in object-oriented languages, which encapsulate (implicit) state and behavior as objects.

In accordance with an aspect of the disclosure, automatic code transformation can be employed to create scalable applications while maintaining an illusion of statefulness. Programmers can write code in a convenient, traditional, imperative style, which can be transformed into stateless code in a state transformer monadic style, subsequently and automatically. Furthermore, intermediate state can be stored at location(s) that further enhance scalability and/or locations that are otherwise appropriate in a given context.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
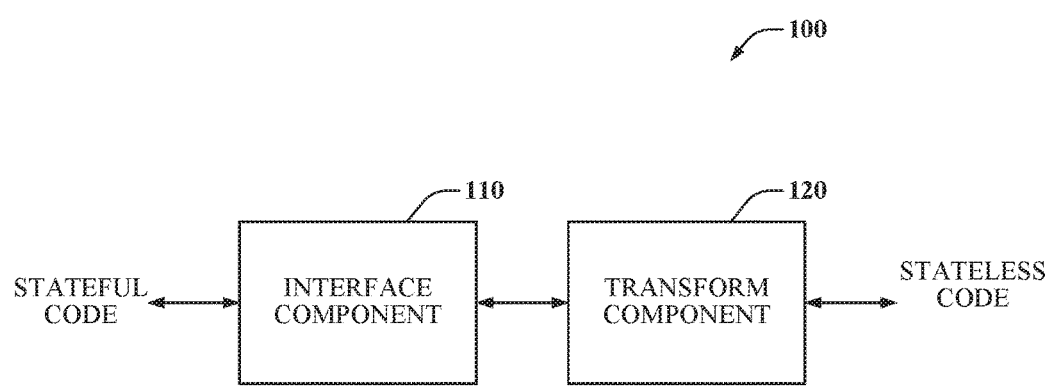
FIG. 1 is a block diagram of a code transformation system in accordance with an aspect of the subject disclosure.

Referring initially to FIG. 1, a code transformation system 100 is illustrated in accordance with an aspect of the claimed subject matter. As shown, the system 100 includes an interface component 110 and a transform component 120 to facilitate transforming stateful code to stateless code.

The interface component 110 provides a mechanism to receive, retrieve, or otherwise obtain or acquire stateful code. Stateful code is a type of code in which state pertaining to previous interactions is maintained. Such code can be associated with programs written in traditional imperative languages in which state is inherent or otherwise made special, for example. In an object-oriented language, for instance, object state is maintained inherently and includes an initial state in addition to any modification made thereto up until a time of observation.

The transform component 120 transforms stateful code to stateless code. In contrast to stateful code, stateless code does not maintain any state. Each transaction is independent and unrelated to any previous transaction. That does not mean, however, that stateful transactions cannot be captured. In accordance with an aspect of the claimed subject matter, the stateful code is automatically transformed into a stateless, state transformer monadic style. More specifically, state can be made explicit and threaded through a sequence of operations in the same way arguments or results are passed. This enables scalability since state is not confined to a single centralized location.

The code transformation system 100 can be embodied as a backend tool to aid programmers in production of scalable code, among other things. As previously mentioned, stateless code provides for the most scalable system, yet for programmers this is counterintuitive as well as inconvenient. As a result, a tension exists between scalability and ease of use. The code transformation system 100 addresses this issue by allowing users to write code in traditional, imperative, stateful style, which is subsequently and automatically transformed into a stateless implementation. After this transformation, each request logically can take current state as an additional argument and returns a new intermediate state as an additional result.

By way of example, consider a situation in which a programmer desires to produce scalable server executable code. A programmer can write code in an imperative stateful language. The transformation system 100 can subsequently be employed to transform that code into a scalable form. More specifically, stateless code can be generated in a state transformer monad style. However, the statefulness is not lost in the transformation but rather it has changed forms. In particular, the transformation provides for threading of state through stateless code as arguments and/or results. In effect, the code transformation system 100 provides an illusion of statefulness for a programmer while providing an illusion of statelessness for an executing server. In any event, since the code is stateless it can be distributed across additional resources when added. In other words, it is scalable.

Figure 2:
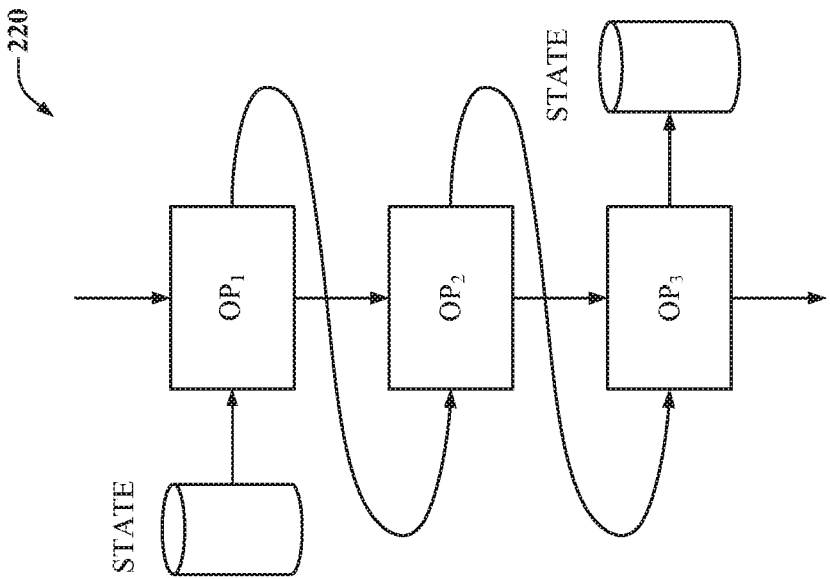
FIG. 2 is a graphical illustration of the effect of code transformation in accordance with disclosed aspect.
Figure 2:
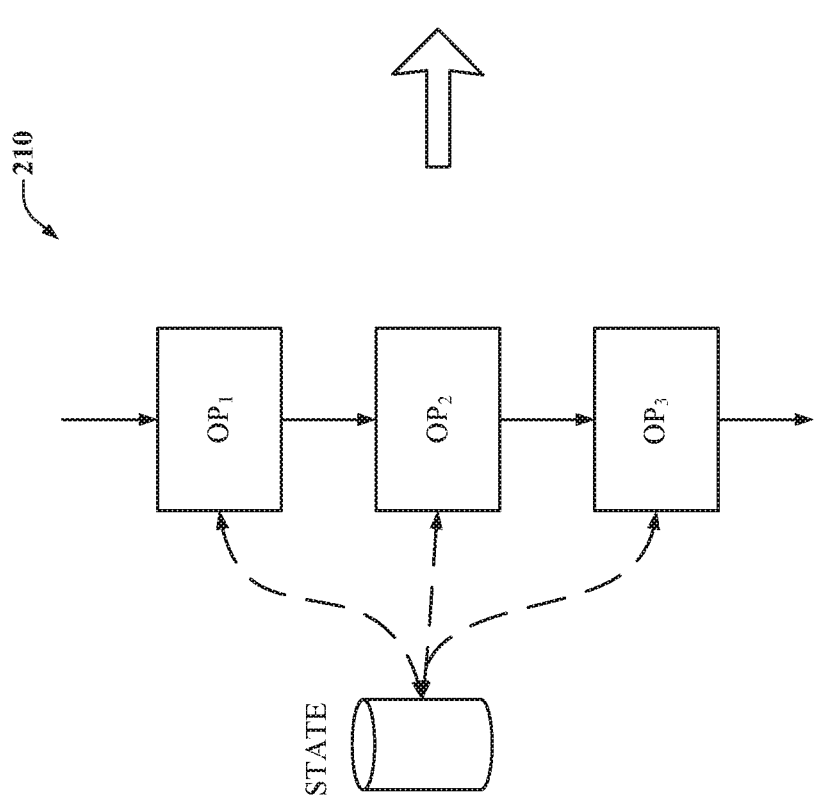

FIG. 2 is a graphical depiction of the effect of code transformation in accordance with an aspect of the claimed subject matter. Illustration 210 depicts a conventional stateful program executing a sequence of operations. For example, consider a contact object whose state is modified first to add a name, then an address, and finally a phone number. In this conventional scenario, an ambient state is maintained that is accessible by all operations. Each operation executes and modifies the state in a specific manner. This is a scalability bottleneck because each operation is tied to a particular implicit instance of state that it needs to access. This program can be transformed as shown in illustration 220.

Here, state and transformation thereof are explicitly visible. Rather than modifying an implicit ambient state while executing a sequence of statements or operations, code that employs a state transformer monad pattern accepts a state as an additional argument and returns modified state as an additional result. This explicit state is then threaded across invocations of subsequent operations. In accordance with the previous example, an initialized object is received by the first operation that adds a name. This object including the added name is threaded to the next operation that adds an address, is threaded to the next operation that adds a phone number. This approach is much more scalable since the program is not dependent upon access to a single implicit state.

Figure 3:
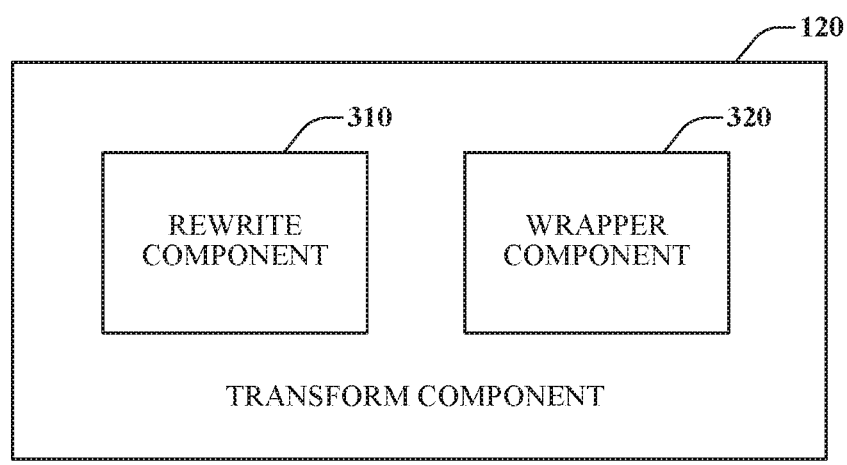
FIG. 3 is a block diagram of a representative transform component according to an aspect of the disclosure.

Turning attention to FIG. 3, a representative transform component 120 is illustrated in accordance with an aspect of the claimed subject matter. The transform component 120 is responsible for converting stateful code to stateless code. This can be accomplished in one of at least two different ways. First, rewrite component 310 can rewrite the stateful code in a stateless form. More specifically, use of implicit state is removed and replaced with an explicit representation of state that can be received by an operation as just another argument and output as another result. Alternatively, wrapper component 320 can be employed to transform code from stateful to stateless. Stated differently, a wrapper can be applied to stateful code to make it function like stateless code. In effect, the wrapper acts as a stateless interface to allow passing and receiving of state.

Figure 4:
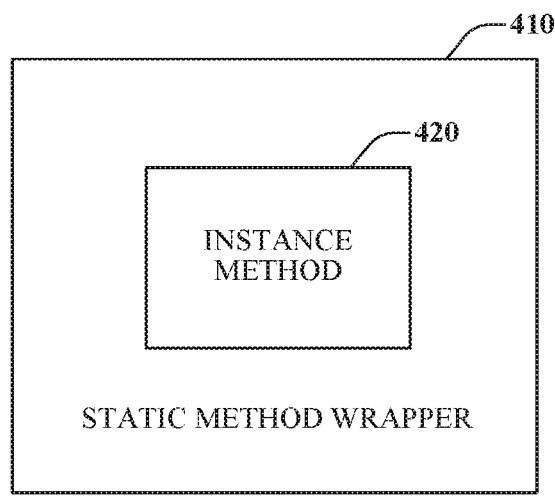
FIG. 4 is a block diagram of a representative wrapper in accordance with an aspect of the disclosed subject matter.

FIG. 4 is a block diagram of a representative wrapper according to an aspect of the claimed subject matter. As shown, a static method wrapper 410 is applied to an instance method 420 thereby converting an instance method to a static method. Generally speaking, instance methods rely on the state of a specific object instance. By contrast static methods do not rely on an object instance but rather are independent thereof. Hence, the wrapper 410 enables interactions with the instance method 420 independent of a particular object instance. Further, the wrapper 410 can receive and pass explicit state together with arguments and results to the instance method 420.

Figure 5:
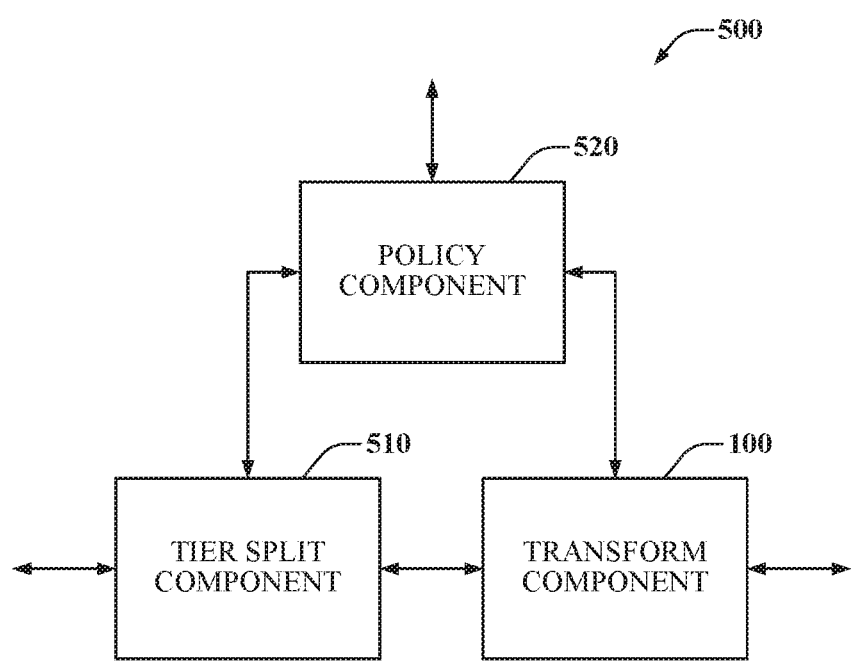
FIG. 5 is a block diagram of a programmatic assistance system according to an aspect of the disclosure.

Referring to FIG. 5, a programmatic assistance system 500 is illustrated in accordance with an aspect of the subject matter claimed. Tier split component 510 provides a mechanism to rewrite or refactor single tier applications into multiple tier applications. Tier split component 510 broadly encompasses dividing applications for execution across different execution contexts. In one specific implementation, the tier split component 510 can generate what is conventionally known as a distributed or multi-tiered application such as an application that runs across a client and server. Refactoring can be performed as a function of metadata. For example, custom attributes can be attached to classes, methods, or the like identifying which tier certain code should execute. In addition to refactoring the tier split component 510 can also create and deploy marshalling code to facilitate execution of code on multiple tiers.

The system 500 also includes transform component or system 100, which can correspond to transform component 120 of FIG. 1 alone or in conjunction with interface component 110. The transform component 100 receives or retrieves tier split application code and transforms it into scalable code. As previously described, this can be accomplished by transforming stateful code to stateless code in accordance with a state transformer monad pattern, for example. In particular, intrinsic ambient state can be replaced with explicit visible state, which can be threaded from statement to statement. In this manner, programmers can design code using inherently stateful objects that can be split by the tier split component 510 for distributed execution and also transformed to scale by the transform component 100.

Policy component 520 provides information to the transform component 100 regarding intermediate state storage. Intermediate state refers to state that is likely to be needed or desired for subsequent processing. For example, an operation can output a new or intermediate state in conjunction with other results that may be threaded to another operation immediately or some time later. In accordance with an aspect of the disclosure, this intermediate state can be saved or store to enable or facilitate subsequent processing. The particular storage location can vary as a function of a variety of factors. These factors or contextual information can be received, retrieved, or otherwise obtained by the policy component 520 and utilized to produce a suggested storage location to the transform component 100. In one instance, the policy component 520 can seek to maximize scalability. Accordingly, it can analyze tier split code to determine upon which tier or other location that intermediate state should be stored to maximize scalability. In another instance, a factor such as security can trump scalability as a primary concern in the storage of intermediate data. For example, the policy component 520 can decide as a function of the code and/or potential use preferences or policies that a client cannot be trusted to include intermediate state data and as such the intermediate state can be stored on a server even though scalability may be hindered in that instance. Alternatively, it may be determined by the policy component 520 that offline processing is desired, so at least a portion of state can identified for storage on a client.

Figure 6:
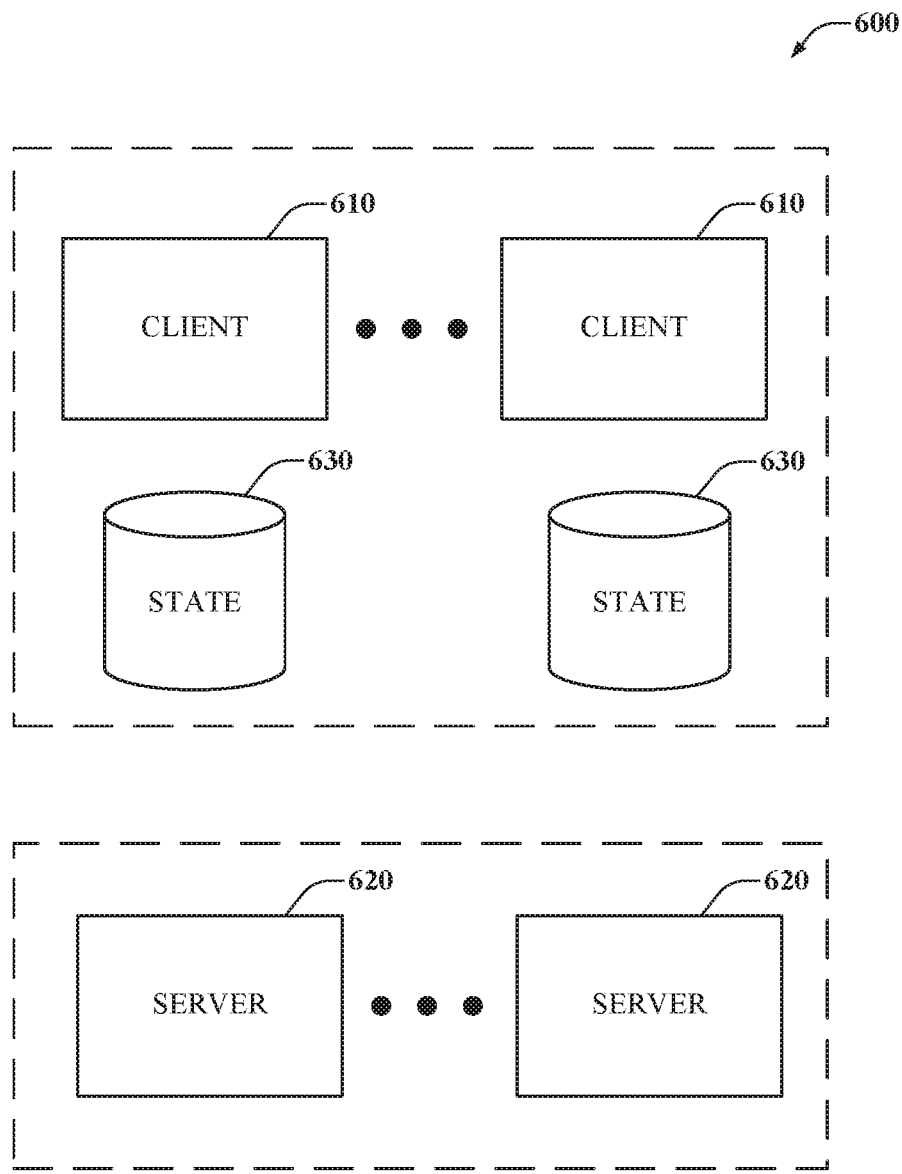
FIG. 6 is a block diagram of a distributed architecture in which state is stored on a client according to a disclosed aspect.
Figure 7:
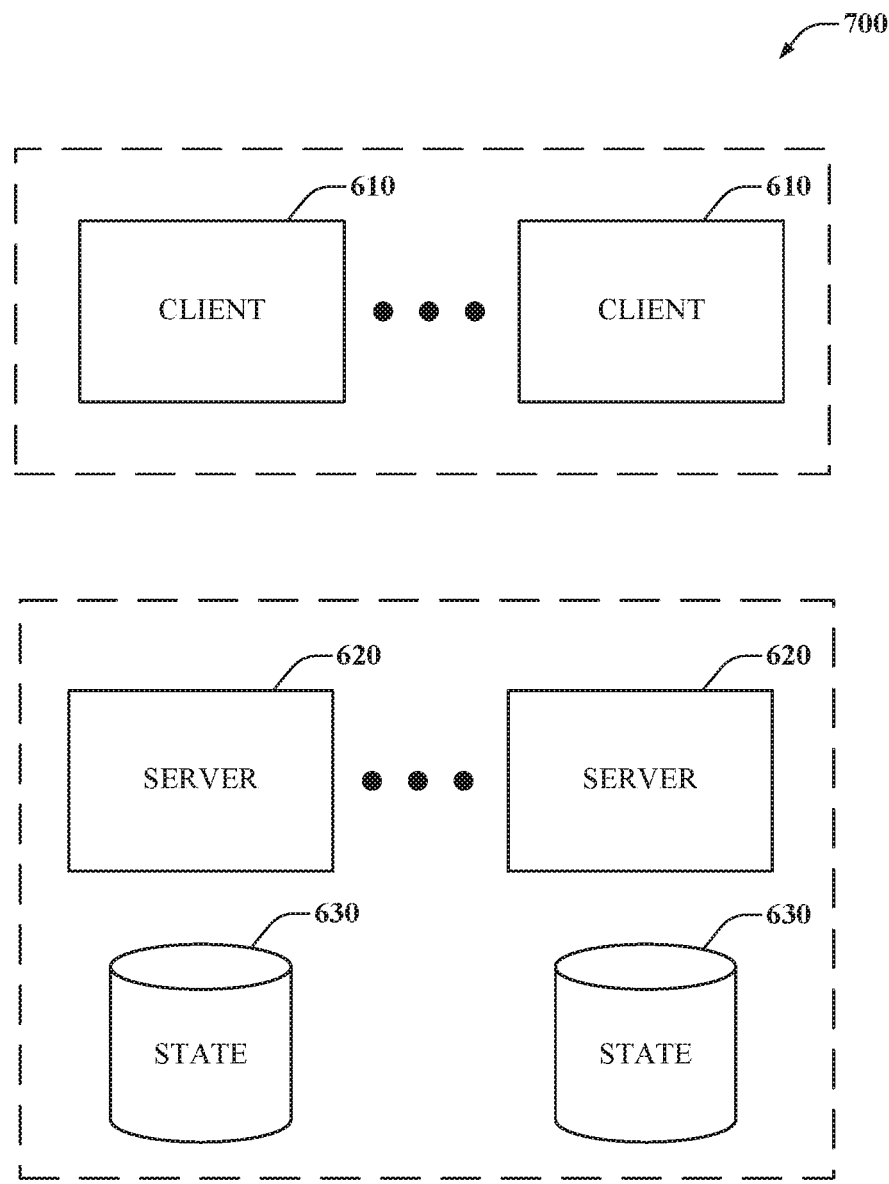
FIG. 7 is a block diagram of a distributed architecture in which state is stored on a server in accordance with an aspect of the disclosure.
Figure 8:
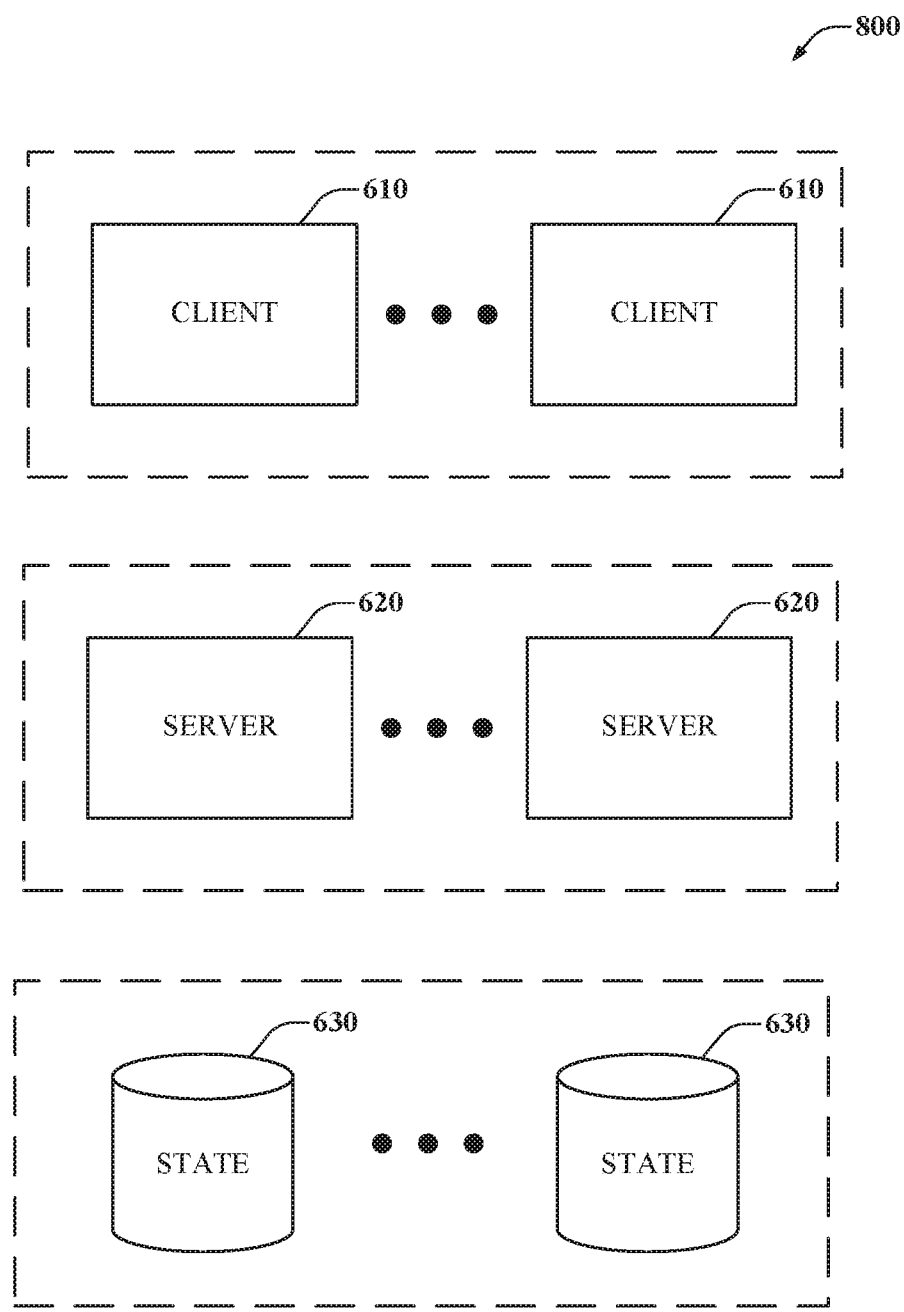
FIG. 8 is a block diagram of a distributed architecture where state is store external to both a client and server in accordance with a disclosed aspect.

Referring to FIGS. 6-8, numerous exemplary architectures are depicted in accordance with aspects of the claimed subject matter. FIG. 6 illustrates a client server architecture 600 including a client 610 and servers 620. Moreover, in this instance, state 630 is stored in a client side database 630. At each interaction with the server 620, the current state is fetched from a local database 630, serialized, and sent with the request to a server 620. The server 620 deserializes the state, performs the requested action, serializes the resulting state, and sends it back to the client 610 with the computed result.

FIG. 7 illustrates an architecture 700 similar to architecture 600 includes client 610 and servers 620. In this case, however, the state is stored in a server side database 630. Here, a client 610 sends with each request an additional cookie or handle to the server 620 that identifies the current state of the client 610. On the server 620, this state is fetched from a database 630, deserialized, used, and serialized.

Before returning a computed value back to the client 610, the server 620 stores the new state or intermediate state to a server side database 630.

FIG. 8 depicts yet another architecture 800 that can be employed with respect to state storage. In particular, the architecture 800 includes client 610, servers 620, and databases 630, but the state is stored in a database 630 external to both client 610 and servers 620. For example, the state can be stored on a dedicated subsystem that supports data replication. In this instance, a client request can include a cookie, URL or the like that identifies the location of the current state. A processing server 620 can retrieve the serialized state from a remote database 630 utilizing the cookie, deserialize the state, process the request, serialize the new state and result, pass the result back to the client, and store the new state to the external database 630.

In any case, note that both the client and the server are logically decoupled from where the state is actually stored. This flexibility allows tuning of the system to different parameters. For instance, when the client is a mobile phone, the bottleneck is the limited bandwidth of the connection over a network and the lack of storage on the device. In other words, it is impractical to send large amounts of data over the network. In that case, the best scalability can be achieved by storing the data close to the server. On the other hand, for rich clients or web browsers, the most scalable solution is to store the state on the client. Of course, there is nothing to prevent a hybrid solution where some state is stored on the client (perhaps based on trust) while some other state is stored on the server.

What follows are a series specific examples of aspects of the claimed subject matter. These examples are provided solely to aid clarity and understanding. Hence, they are not meant to limit the scope of the claims in any way. In particular, the examples pertain to specific instances of code transformation in a state transformer monad style.

Consider the following class "C" with a single instance field of type "Z", and a single method "X F(Y y)" as follows:

```
class C
{
    Z z;
    X F(Y y) { ...}
}
```

Assuming an intrinsically stateful web server (e.g., a web server that supports session state), the implementation of this class as a web service using tier-splitting would create a proxy class on the client that maintains a handle/cookie that represents that mirror instance of the class running on the server.

```
class C
{
    Cookie cookie
    X F(Y y
    {
        serialize y;
        Invoke F remotely on C_Service using cookie and
        serialized argument y;
        deserialize result;
    }
}
```

The corresponding service class on the server would look like something similar to the following (where "S" is the type used for serialization of values across the network, this could be XML, JSON, or some binary format such as base64 strings, among other things):

```
class C_Service
{
    S F(Cookie cookie, S y)
    {
        deserialize y;
            get instance c from session state using cookie;
            c.F(y);
            serialize result;
        send result to client;
    }
}
```

Note that in this case, the object instance "c" is kept alive (in memory) during the whole session and is not serialized.

In contrast to the above management of session state, the disclosed transformation utilizing state transformer monadic style appears below. If state is stored on the client, the client code is modified to get the state from the local database and send it with the regular arguments to the server and store the new state in the database upon return:

```
class C
{
    Cookie cookie
    X F(Y y)
    {
serialize y;
        get serialized state from local database using cookie;
        Invoke F remotely on C_Service using serialized state and
        serialized argument y;
        store serialized successor state in local database;
        deserialize result;
    }
}
```

The server-side code follows the state transformer monad pattern, since it now takes the current state as argument and returns the new state as a result:

```
class C_Service
{
    SerializedState,S F(SerializedState s, S y)
    {
        deserialize y;
        deserialize s into instance c;
        c.F(y);
        serialize c;
        serialize result;
    send result and state to client;
    }
}
```

If the state is stored on the server, the client code does not change from the original version.

```
class C
{
    Cookie cookie
    X F(Y y)
    {
        serialize y;
        Invoke F remotely on C_Service using cookie and
        serialized argument y;
        deserialize result;
    }
}
```

The server code still uses the state transformer monad pattern, but it is called indirectly by a wrapper function that handles the state management:

```
class C_Service
{
    SerializedState,S F' (SerializedState s, S y)
    {
        deserialize y;
        deserialize s into instance c;
        c.F(y);
        serialize c;
       serialize result;
    }
    X F(Cookie cookie, S y)
    {
        get serialized session s state from database from
    cookie
        call F'(s,y) returning result r and new state s';
        store s' in database under cookie c;
        send result r back to the client;
    }
}
```

Here, the state management code was moved from the client to the server

Unlike conventional models where session state is implicitly serialized, programmers have full control over state serialization. More importantly, the same serialization mechanism can be used for intermediate state as for service arguments and results. It is this uniformity that allows movement of state storage between client and server. There is no distinction between regular arguments and results and the additional argument and result inserted by the state transformer monad transformation.

As previously mentioned, when state is stored locally on the client, it becomes possible to support offline operation in a seamless way with minimal changes to the client side code since all necessary state to perform the computation is available on the client. The client code can be specified as follows:

```
class C
{
    Cookie cookie
    X F(Y y)
    {
        get serialized state s from local database using cookie;
    Locally compute F using s and y s.F(Y);
        serialize s;
    store serialized successor state s in local database using
        cookie;
    }
}
```

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

In accordance with an aspect of the claimed subject matter, it is to be noted that illusions can be provided with respect to both a client side and server side. In particular, client programmers are provided an illusion of statefulness to ensure ease of use, and server programmers are afforded an illusion of statelessness to enable scalability. This is achieved by performing program transformation on both client and server based on the categorical notion of state transformer monads.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the policy component 530 can employ such mechanism to infer locations for state storage given context information.

In view of the exemplary systems described supra, methodologies that may be implemented in accordance with the disclosed subject matter will be better appreciated with reference to the flow charts of FIGS. 9-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 9:
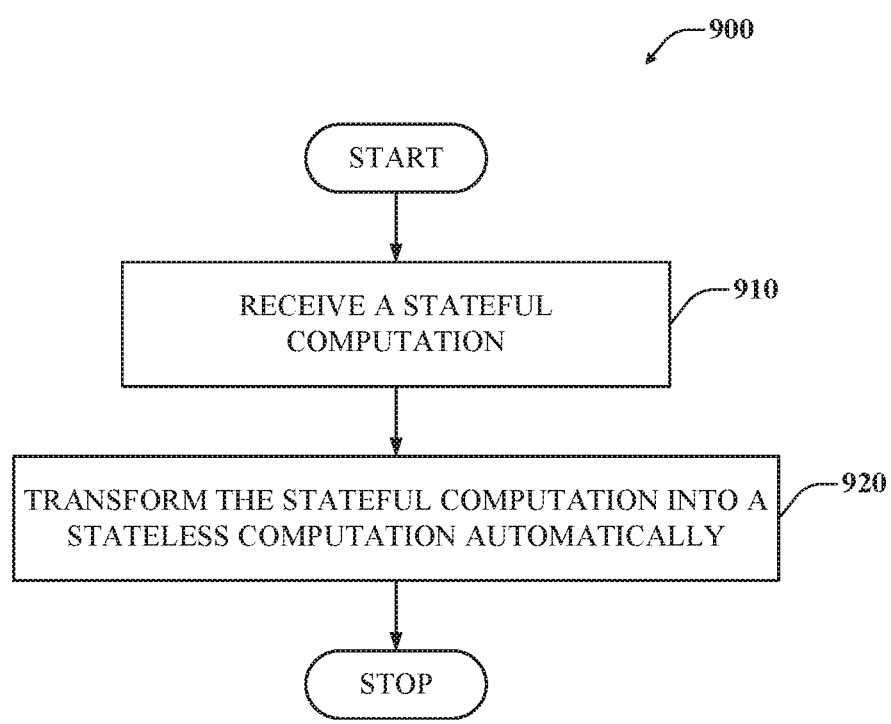
FIG. 9 is a flow chart diagram of a method of code transformation according to an aspect of the disclosure.

Referring to FIG. 9, a code transformation method 900 is illustrated in accordance with an aspect of the claimed subject matter. At reference numeral 910, a stateful computation is received, retrieved, or otherwise identified. For instance, the computation can be or form part of a computer program specified in an imperative language. At numeral 920, the stateful computation is transformed automatically into a stateless computation, for example in accordance with a state transformer monadic pattern. Stated differently, a computation that employs inherent or ambient state can be transformed such that is state visible or explicit and passed in a similar manner as arguments and results. The transformation can take the form of a rewrite of the actual code or injection of a wrapper, interface or the like such that a stateful item can be interacted with as if it we stateless.

Figure 10:
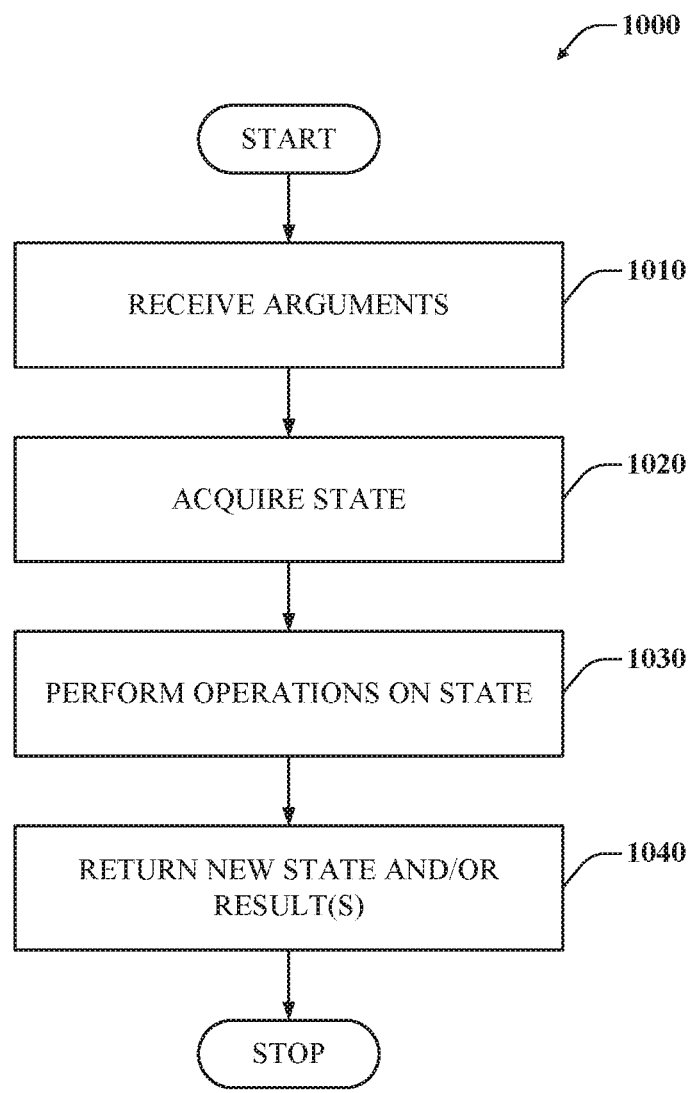
FIG. 10 is a flow chart diagram of a method of stateless computation in accordance with a disclosed aspect.

FIG. 10 depicts a method of stateless computation in accordance with an aspect of the claimed subject matter. At reference numeral 1010, arguments are received. These arguments are values or references associated with parameters of the computation. At numeral 1020, state is acquired. In one embodiment, state can be passed directly in the same or similar manner in which arguments are passed. Additionally or alternatively, references can be passed that identify a location from which state can be retrieved. At reference 1030, operations or computations are performed to modify state or in other words generate new state. At reference numeral 1040, the new state and other result(s) are returned. In one instance, both the new state and result(s) can be passed to another computation as arguments. Alternatively, state can be serialized and saved to a location and the results returned.

Figure 11:
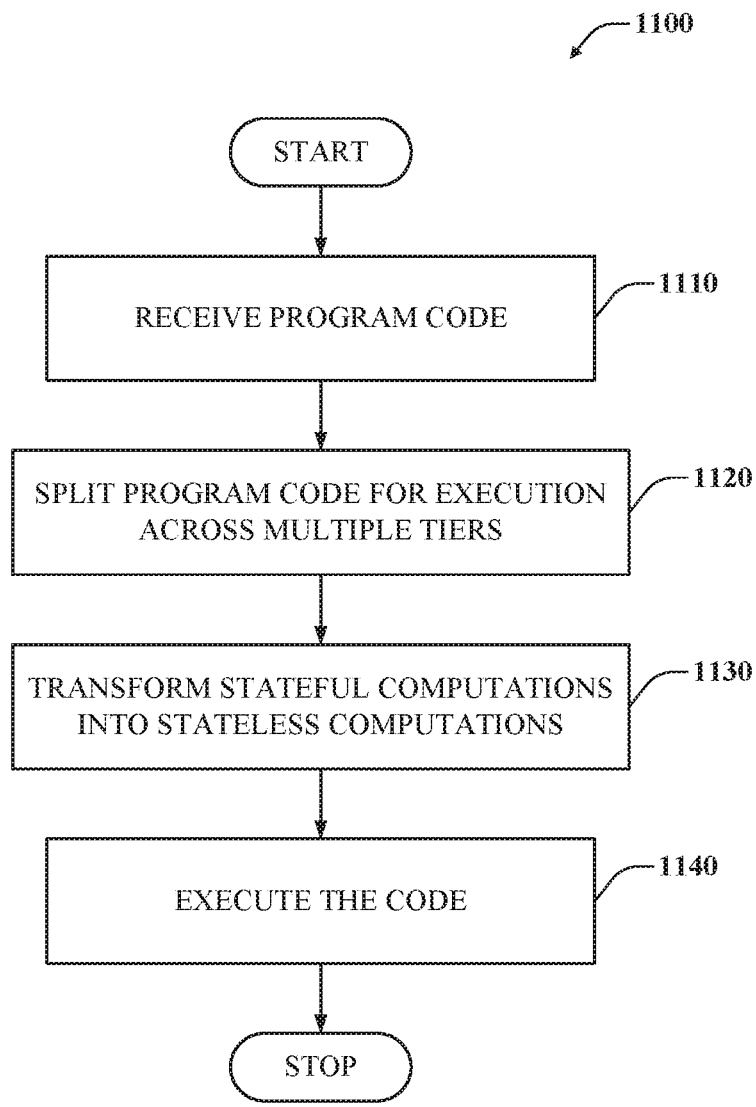
FIG. 11 is a flow chart diagram of a method of programmatic assistance in accordance with an aspect of the disclosure.

FIG. 11 is a flow chart diagram of a method of programmatic assistance 1100 in accordance with an aspect of the claimed subject matter. At reference numeral 1110, program code specified in an imperative language, for instance, is received, retrieved, or otherwise identified. This can correspond to code produced by a programmer. At numeral 1120, the program code is split for execution across multiple tiers. For instance, code can be refactored in accordance with metadata associated with the code identifying a specific execution context or environment. At reference numeral 1130, stateful computations specified by distributed code are transformed into stateless computations to enable scaling. By way of example, code can be rewritten in a state transformer monad style where inherent or intrinsic state is made explicit and passable in a manner similar to arguments and results, among other things. Finally, the code can be executed at 1140. During execution, explicit state can be threaded from operation to operation. As a result of the assistance method 1100, programmers need only construct and test single tier stateful applications. Subsequently, the code can be automatically split for distributed execution and transformed to ensure scalability.

Figure 12:
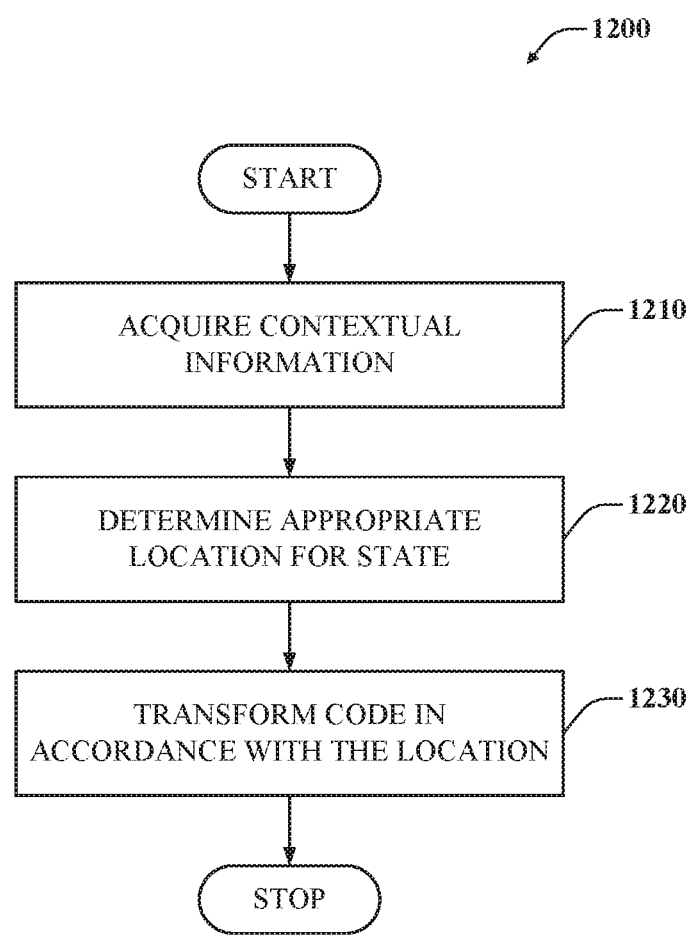
FIG. 12 is a flow chart diagram of a method of code transformation in accordance with a disclosed aspect.

Turning attention to FIG. 12, a method of code transformation is 1200 is illustrated in accordance with an aspect of the claimed subject matter. At reference numeral 1210, contextual information is acquired concerning application code. This can be obtained or inferred from the code itself or outside factors. Such outside factors can be information regarding a target execution environment and/or specified developer preferences or policies. At numeral 1220, an appropriate location for storage of state is determined or inferred as a function of the contextual information. The appropriate location can refer to that which maximizes scalability where possible. For example, where it can be determined that code will be executed on a mobile device with corresponding limited bandwidth, storage capacity and processing power, the state can be stored on a server or other dedicated subsystem. Similarly, if it can be determined or inferred that a client cannot be trusted with state then it can be stored external thereto. At reference numeral 1230, code is transformed from stateful to stateless where the explicit state or intermediate state is stored in accordance with the identified location.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 13:
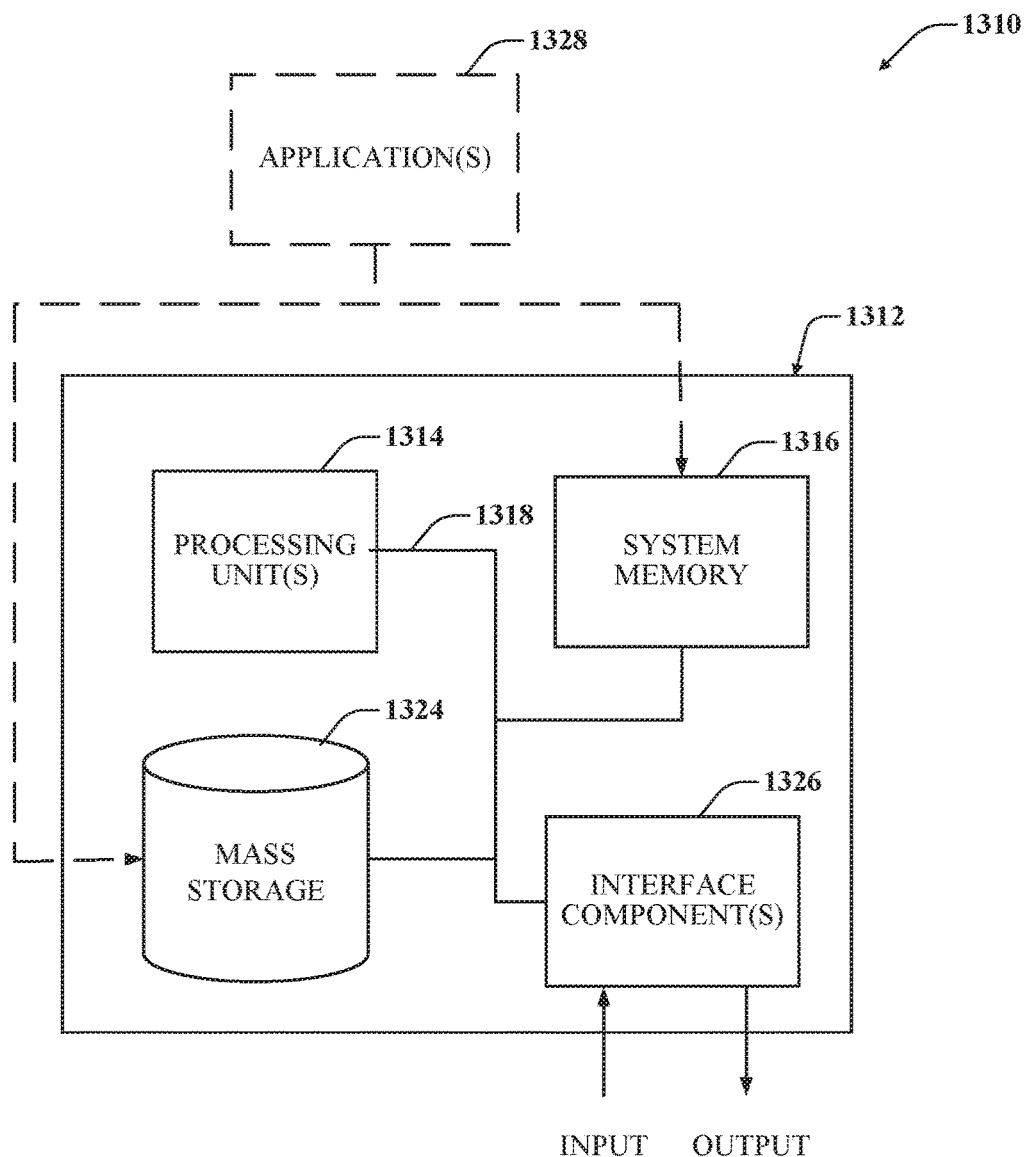
FIG. 13 is a schematic block diagram illustrating a suitable operating environment for aspects of the subject disclosure.
Figure 14:
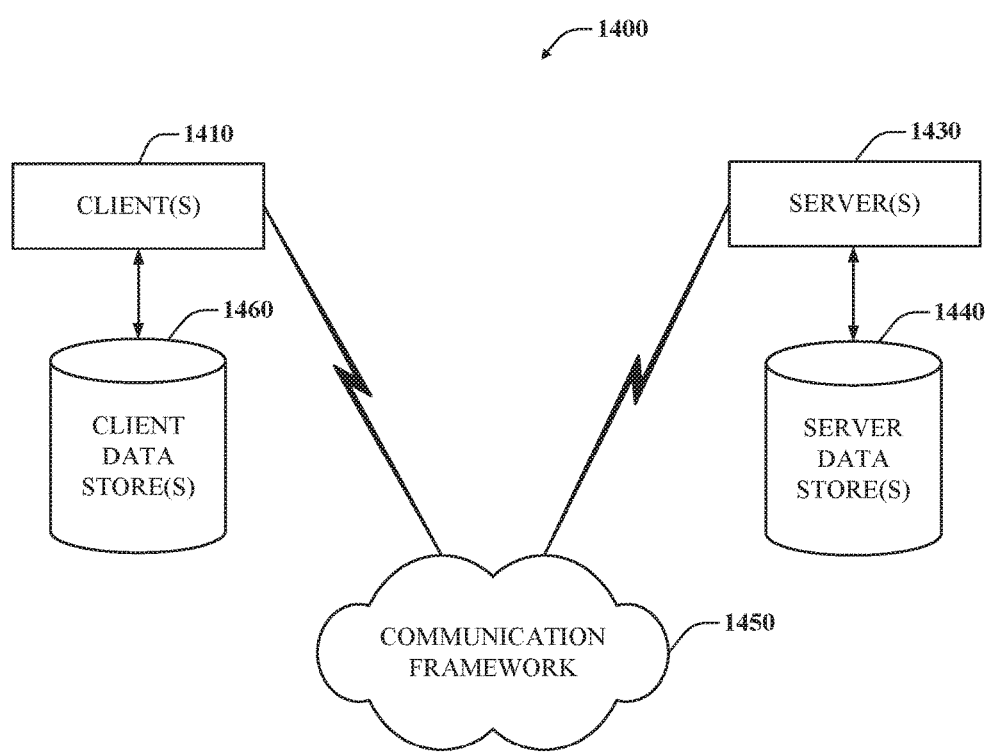
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 13, an exemplary environment 1310 for implementing various aspects disclosed herein includes a computer 1312 (e.g., desktop, laptop, server, hand held, programmable consumer or industrial electronics . . . ). The computer 1312 includes a processing unit 1314, a system memory 1316, and a system bus 1318.

The system bus 1318 couples system components including, but not limited to, the system memory 1316 to the processing unit 1314. The processing unit 1314 can be any of various available microprocessors. It is to be appreciated that dual microprocessors, multi-core and other multiprocessor architectures can be employed as the processing unit 1314.

The system memory 1316 includes volatile and nonvolatile memory. The basic input/output system (BIOS), containing the basic routines to transfer information between elements within the computer 1312, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1312 also includes removable/non-removable, volatile/non-volatile computer storage media. FIG. 13 illustrates, for example, mass storage 1324. Mass storage 1324 includes, but is not limited to, devices like a magnetic or optical disk drive, floppy disk drive, flash memory, or memory stick. In addition, mass storage 1324 can include storage media separately or in combination with other storage media.

FIG. 13 provides software application(s) 1328 that act as an intermediary between users and/or other computers and the basic computer resources described in suitable operating environment 1310. Such software application(s) 1328 include one or both of system and application software. System software can include an operating system, which can be stored on mass storage 1324, that acts to control and allocate resources of the computer system 1312. Application software takes advantage of the management of resources by system software through program modules and data stored on either or both of system memory 1316 and mass storage 1324.

The computer 1312 also includes one or more interface components 1326 that are communicatively coupled to the bus 1318 and facilitate interaction with the computer 1312. By way of example, the interface component 1326 can be a port (e.g. serial, parallel, PCMCIA, USB, FireWire . . . ) or an interface card (e.g., sound, video, network . . . ) or the like. The interface component 1326 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1312 to output device(s) via interface component 1326. Output devices can include displays (e.g., CRT, LCD, plasma . . . ), speakers, printers and other computers, among other things.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the aspects of the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430.

Client/server interactions can be utilized with respect with respect to various aspects of the claimed subject matter. As previously described, code can be split and executed across one or more clients 1410 and servers 1430 which communicate via the communication framework 1450. Furthermore, state can be stored in either client data store(s) 1430 and/or server data store(s) 1440.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

The invention claimed is:

1. A system comprising:
   a processing device; and
   a non-transitory computer-readable storage media configured to store computer-executable instructions that, upon execution by the processing device, control the system to perform:
     receiving stateful code that is called from a first location and executed at a second location;
     acquiring contextual information associated with the stateful code;
     determining a location for storage of state information based on the contextual information; and
     based on the determined location, transforming the stateful code into stateless code, wherein:
       the transforming includes storing state information for the stateful code into storage at the determined location; and
       in response to the determined location being the first location, the stateless code includes:
         at the first location, retrieving the state information from the storage at the first location;
         from the first location, sending a call to the second location, wherein one argument of the call includes the retrieved state information;
         at the first location, receiving a response from the second location, wherein one return value includes new state information; and
         storing the new state information into the storage at the first location.

2. The system of claim 1, wherein the first location is a client device and the second location is a server.

3. The system of claim 1, wherein the stateful code is specified in an imperative programming language.

4. The system of claim 1, wherein, in response to the determined location being the first location, the storing of the stateless code includes replacing the state information in the storage at the first location with the new state information.

5. The system of claim 1, wherein, in response to the determined location being the second location, the stateless code includes:
   from the first location, sending a call to the second location, wherein one argument of the call is a unique identifier of the state information;
   at the second location, obtaining the state information from the storage based on the unique identifier;
   at the second location, generating new state information based on the obtained state information; and
   storing the new state information into the storage of the second location based on the unique identifier.

6. The system of claim 5, wherein, in response to the determined location being a third location, the stateless code includes:
   from the first location, sending a call to the second location, wherein one argument of the call is a unique identifier of the state information;
   at the second location, obtaining the state information from the third location based on the unique identifier, wherein the third location is located remotely from the second location;
   at the second location, generating new state information based on the obtained state information; and
   storing the new state information into the storage of the third location based on the unique identifier.

7. The system of claim 1, wherein, in response to the determined location being the first location, the stateless code includes:
   serializing the retrieved state information to create the one argument of the call; and
   deserializing the one return value to recover the new state information.

8. The system of claim 1 wherein the contextual information includes a security parameter of the state information.

9. The system of claim 8 wherein the determining includes, in response to the security parameter indicating that the first location is not trusted to store the state information, selecting the second location.

10. The system of claim 1 wherein:
    the contextual information includes at least one of capability information of the first location and capability information of the second location; and
    the capability information includes at least one of bandwidth, storage capacity, and processing power.

11. The system of claim 10 wherein the determining includes, in response to the capability information of the first location being limited with respect to the capability information of the second location, selecting the second location.

12. The system of claim 1 wherein:
    the transforming includes creating a wrapper for the stateful code; and
    the wrapper is configured to implement the retrieving the state information, the sending the call, the receiving the response, and the storing the new state information.

13. A method comprising:
    receiving stateful code that is called from a first location and executed at a second location;
    acquiring contextual information associated with the stateful code;

determining a location for storage of state information based on the contextual information; and based on the determined location, transforming the stateful code into stateless code, wherein:

the transforming includes storing state information for the stateful code into storage at the determined location; and in response to the determined location being the first location, the stateless code includes:

at the first location, retrieving the state information from the storage at the first location;

from the first location, sending a call to the second location, wherein one argument of the call includes the retrieved state information;

at the first location, receiving a response from the second location, wherein one return value includes new state information; and storing the new state information into the storage at the first location.

14. The method of claim 13, wherein:

the first location is a client device and the second location is a server; and the stateful code is specified in an imperative programming language.

15. The method of claim 13, wherein, in response to the determined location being the first location, the storing of the stateless code includes replacing the state information in the storage at the first location with the new state information.

16. The method of claim 13, wherein, in response to the determined location being the second location, the stateless code includes:

from the first location, sending a call to the second location, wherein one argument of the call is a unique identifier of the state information;

at the second location, obtaining the state information from the storage based on the unique identifier;

at the second location, generating new state information based on the obtained state information; and storing the new state information into the storage of the second location based on the unique identifier.

17. The method of claim 16, wherein, in response to the determined location being a third location, the stateless code includes:

from the first location, sending a call to the second location, wherein one argument of the call is a unique identifier of the state information;

at the second location, obtaining the state information from the third location based on the unique identifier, wherein the third location is located remotely from the second location;

at the second location, generating new state information based on the obtained state information; and storing the new state information into the storage of the third location based on the unique identifier.

18. The method of claim 13, wherein, in response to the determined location being the first location, the stateless code includes:

serializing the retrieved state information to create the one argument of the call; and deserializing the one return value to recover the new state information.

19. The method of claim 13 wherein:

the contextual information includes a security parameter of the state information; and the determining includes, in response to the security parameter indicating that the first location is not trusted to store the state information, selecting the second location.

20. The method of claim 13 wherein:

the contextual information includes at least one of capability information of the first location and capability information of the second location;

the capability information includes at least one of bandwidth, storage capacity, and processing power; and the determining includes, in response to the capability information of the first location being limited with respect to the capability information of the second location, selecting the second location.

* * * * *